(12) United States Patent
Mazaki et al.

(10) Patent No.: US 7,303,695 B2
(45) Date of Patent: Dec. 4, 2007

(54) PROCESS FOR PRODUCING OPTICALLY ACTIVE LIQUID CRYSTALLINE POLYMER COMPOUND

(75) Inventors: Hitoshi Mazaki, Yokohama (JP); Hirofumi Aizono, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 128 days.

(21) Appl. No.: 11/277,524

(22) Filed: Mar. 27, 2006

(65) Prior Publication Data

US 2006/0157672 A1   Jul. 20, 2006

Related U.S. Application Data

(63) Continuation of application No. PCT/JP2004/014805, filed on Sep. 30, 2004.

(30) Foreign Application Priority Data

Oct. 2, 2003  (JP) .............................. 2003-344299

(51) Int. Cl.
*C09K 19/38* (2006.01)
*B32B 27/36* (2006.01)

(52) U.S. Cl. ............... 252/299.01; 428/1.1; 428/411.1; 428/480; 252/299.67

(58) Field of Classification Search .......... 252/299.01, 252/299.67; 428/1.1, 1.3, 411.1, 480
See application file for complete search history.

(56) References Cited

U.S. PATENT DOCUMENTS

| 5,258,134 | A | * | 11/1993 | Yoshinaga et al. ..... 252/299.01 |
| 5,491,001 | A | | 2/1996 | Mazaki et al. |
| 5,510,913 | A | * | 4/1996 | Hashimoto et al. ......... 349/194 |
| 6,248,259 | B1 | | 6/2001 | Izumi et al. |

FOREIGN PATENT DOCUMENTS

| JP | 04-031405 A | 2/1992 |
| JP | 5-61039 A | 3/1993 |
| JP | 06-186534 A | 7/1994 |
| JP | 10-158268 A | 6/1998 |

* cited by examiner

*Primary Examiner*—Shean C Wu
(74) *Attorney, Agent, or Firm*—Akin Gump Strauss Hauer & Feld LLP

(57) ABSTRACT

A process is provided for producing efficiently an optically active liquid crystalline polymer compound excellent in mechanical strength or optical characteristics at low cost, in which in that a liquid crystal polymer compound having in its main chain or side chain an ester bond is reacted with an optically active low molecular weight compound having a hydroxyl group so as to introduce the low molecular weight compound in the polymer compound as a unit having an optically active group.

9 Claims, No Drawings

PROCESS FOR PRODUCING OPTICALLY ACTIVE LIQUID CRYSTALLINE POLYMER COMPOUND

CROSS-REFERENCE TO RELATED APPLICATIONS

This application is a continuation of International Application No. PCT/JP2004/014805, filed Sep. 30, 2004, which was published in the Japanese language on Apr. 14, 2005 under International Publication No. WO 2005/033178 A1, and the disclosure of which is incorporated herein by reference.

BACKGROUND OF THE INVENTION

The present invention relates to a process for producing an optically active liquid crystalline polymer compound useful as an optical material or a high strength material.

Optically active liquid crystalline polymer compounds have various applications such as high strength materials or optical materials and thus are highly available. Form the viewpoint of industrial utilization, the production cost of such polymer compounds is so important that they can be produced by an inexpensive process such as a synthesis method using melt-polycondensation which may be efficiently conducted even in the absence of a solvent.

Generally, the majority of liquid crystalline polymer compounds comprise an aromatic dicarboxylic acid unit, an aromatic diol unit and an aromatic oxycarboxylic acid unit. Therefore, after the phenolic hydroxyl groups of such compounds are usually acetylated with acetic anhydride in a reaction vessel, the compounds are subjected to melt-polycondensation in the same reaction vessel.

The production of a liquid crystalline polymer compound using a solution technique or method is industrially disadvantageous because of less amount of producible polymers per reactor, involvement of a complex step for activating reaction products and necessity of an after-treatment. The oxycarboxylic acid unit is not suitable for the reaction using a solution because the unit is likely to be blocked by itself. Therefore, there is a limit to the types of producible polymers with this solution technique.

That is, when an optically active liquid crystalline polymer compound is produced by introducing an optically active compound having an aliphatic hydroxyl group to a liquid crystalline polymer compound, there has been a problem that there are many restrictions in synthesis. For example, Patent Documents 1 and 2 below each disclose a method of producing a cholesteric film using a polyester wherein materials are mainly prepared by blending a liquid crystalline polymer as the base material with an optically active polymer or compound. Patent Document 3 discloses a side chain optically active polymer which is produced through a complex multi-steps. Therefore, in such a situation as described, there has been demanded a process wherein an optically active liquid crystalline polymer can be easily produced.

Patent Document 1: Japanese Patent Laid-Open Publication No. 5-61039

Patent Document 2: Japanese Patent Laid-Open Publication No. 6-186534

Patent Document 3: Japanese Patent Laid-Open Publication No. 10-158268

BRIEF SUMMARY OF THE INVENTION

The present invention intends to solve the above-described problems and provides a process which can produce an optically active liquid crystalline polymer compound with excellent strength and optical characteristics at an inexpensive cost.

That is, the present invention relates to a process for producing an optically active liquid crystalline polymer compound wherein a liquid crystalline polymer compound having in its main or side chain an ester bond is reacted with an optically active low molecular weight compound having a hydroxyl group so that the latter is introduced as a unit having an optically active group into the polymer compound.

The optically active low molecular weight compound is preferably a compound having a hydroxyl group bonded to an aliphatic carbon. The liquid crystalline polymer compound is preferably a polyester having an ortho-substituted aromatic unit.

The present invention also relates to an optical film formed of an optically active liquid crystalline polymer compound produced by the above-described process.

DETAILED DESCRIPTION OF THE INVENTION

The present invention is characterized in that a liquid crystalline polymer compound having an ester bond is reacted with an optically active low molecular weight compound.

The liquid crystalline polymer compound having an ester bond used in the present invention is classified into a main chain liquid crystalline polymer compound having in its main chain an ester bond and a side chain liquid crystalline polymer compound having in its side chain an ester bond.

Examples of the main chain liquid crystalline polymer compound include those containing in their main chains a large number of ester bonds (—COO—). The main chain liquid crystalline polymer compound may be those containing in its main chain a bond other than an ester bond, such as an amide bond (—CONH—), an imide bond (—CO—N(—)—CO—) or an ether bond (—O—).

The side chain liquid crystalline polymer compound used in the present invention is a liquid crystalline polymer compound comprising a main chain forming a polymer chain and a pendant side chain exhibiting liquid crystallinity and hanging therefrom.

The liquid crystalline polymer compound which may be used in the present invention may be any of main chain liquid crystalline polymer compounds having in the main chain an ester bond or side chain liquid crystalline polymer compounds having in the side chain an ester bond. Among these compounds, most preferred are main chain liquid crystalline polymer compounds containing in the main chain a large number of ester bonds, more specifically liquid crystalline polyesters.

Units constituting such a liquid crystalline polyester are generally classified into a dicarboxylic acid unit, a diol unit and an oxycarboxylic acid unit. Specific examples of these units include the following structural units.

Examples of the dicarboxylic acid unit include those having the following structures:

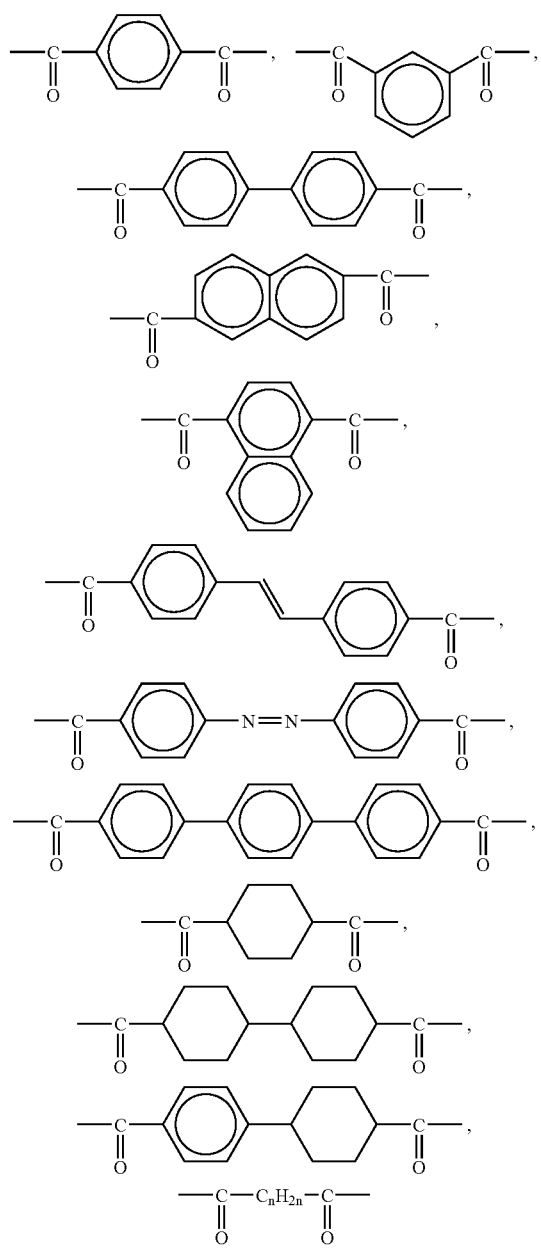

(n is an integer of 4 or greater and 12 or less).

Examples of the diol units include those having the following structures:

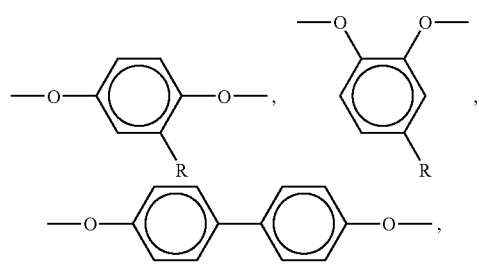

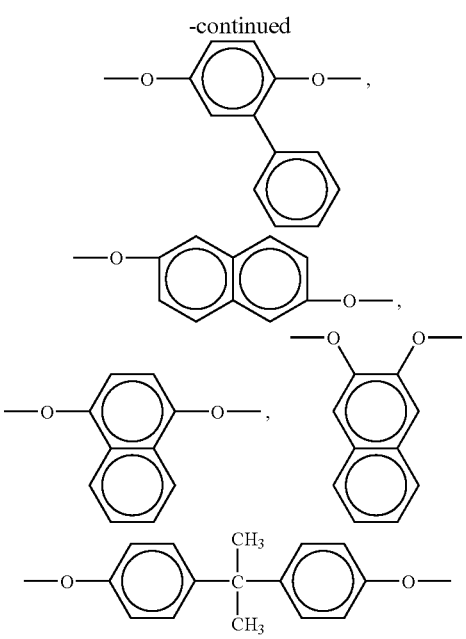

(R is hydrogen or an alkyl or alkoxy group having 1 to 4 carbon atoms).

Examples of the oxycarboxylic acid unit include those having the following structures:

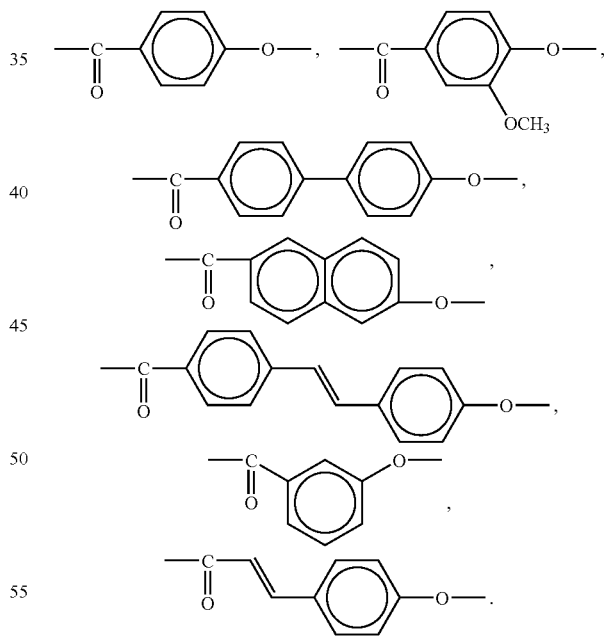

Liquid crystalline polyesters having any structural unit selected from the above examples are preferably used as the liquid crystalline polymer compound in the present invention.

The liquid crystalline polymer compound used in the present invention is more preferably a compound containing at least one ortho-substituted aromatic unit as a structural unit. Introduction of such an ortho-substituted aromatic unit can increase the glass transition temperature of the liquid crystalline polymer compound and suppress the exhibition of crystallinity thereof. The liquid crystalline polymer compound containing an ortho-substituted aromatic unit is suitably used in the process of the present invention because it can be suppressed from the exhibition of a crystal phase under suitable reaction temperature conditions during its reaction with the optically active low molecular weight compound having a hydroxyl group hereinafter described in detail. Examples of the ortho-substituted aromatic unit include those having the following structure:

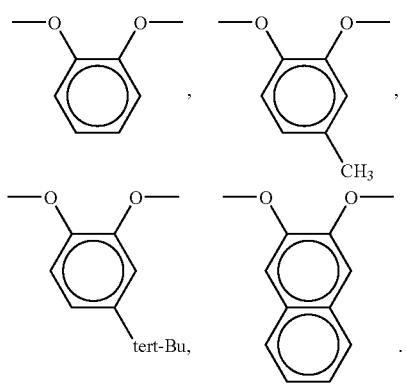

Liquid crystalline polyesters which may be used in the present invention are preferably those comprising a dicarboxylic acid unit, a diol unit and an oxycarboxylic acid unit.

The composition ratio of these units, for example, the dicarboxylic acid unit to the diol unit is usually from 0.8:1.2 to 1.2:0.8, preferably about 1:1 by mole. The oxycarboxylic acid may be present at any ratio in all the structural units. The ortho-substituted aromatic unit is not necessarily present in the polyester. However, the ortho-substituted aromatic unit is present in an amount of preferably 5 to 50 percent by mole, more preferably 10 to 45 percent by mole, and particularly preferably 15 to 40 percent by mole, based on all the constituting units.

The liquid crystalline polymer compound having an ester bond such as liquid crystalline polyesters may be synthesized by a conventional melt-polycondensation method. The liquid crystalline polymer compound may also be synthesized by a solution method depending on its kind or combination of the structural units. However, melt-polcondensation is still preferable from an industrial standpoint.

Melt-polycondensation may be conducted by a de-acetate reaction of a carboxylic acid with an acetylated product of a phenolic hydroxyl group. The phenolic hydroxyl group may be acetylated in advance. Alternatively, there may be employed a method wherein free hydroxyl groups are used as the starting material and acetylated with acetic anhydride in a reactor vessel.

Specific examples of the liquid crystalline polyesters produced by such methods include those represented by the following formulas:

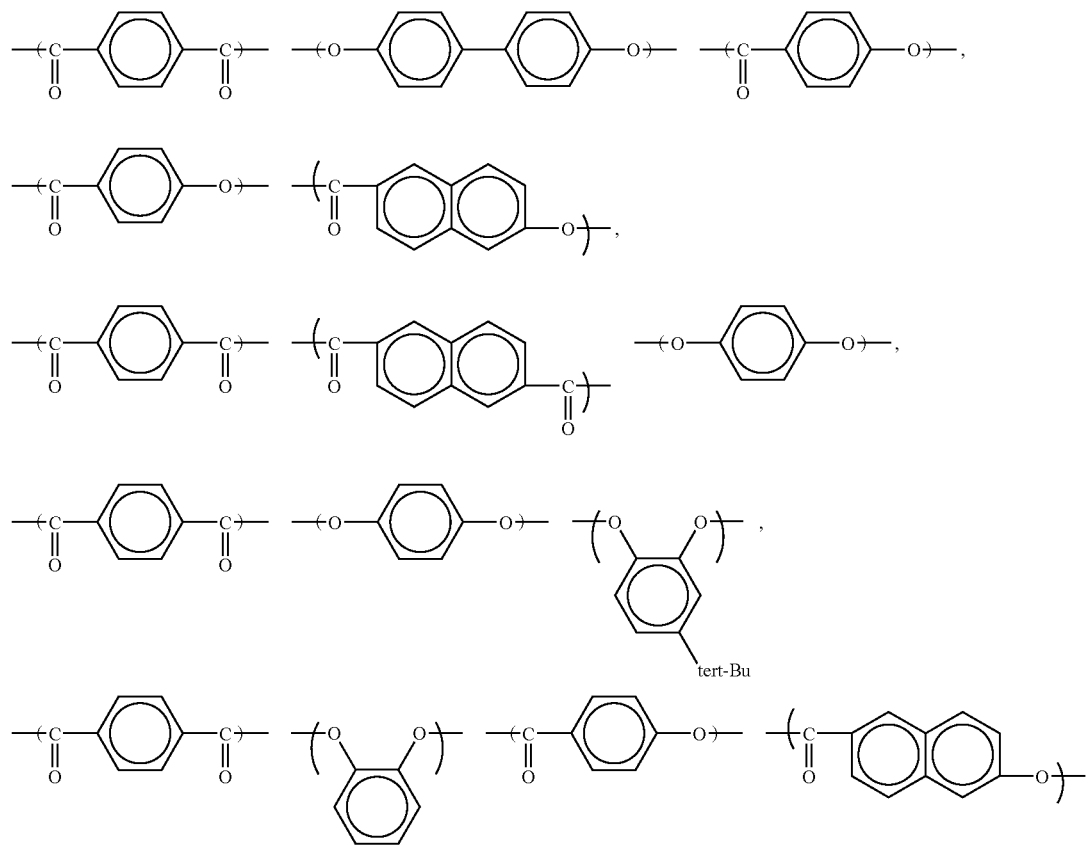

Examples of the optically active low molecular weight compound having an aliphatic hydroxyl group used in the present invention include optically active alcohols, monofunctional compounds such as cholesterol and menthol, and difunctional compounds such as 1,2-propanediol, 1,3-butanediol, 2,3-butanediol, 2-methylbutanediol, 3-methylhexanediol, 2,4-pentanediol, 2,5-hexanediol, 3,6-octanediol, tartaric acid derivatives, isosorbide and isomannide. The optically active low molecular weight compound may also be an optically active compound having, for example, a hydroxyl group and an amino group in combination, such as an aminoalcohol. However, the optically active low molecular weight compound having an aliphatic hydroxyl group used in the present invention is not limited to these compounds.

In the present invention, an optically active liquid crystalline polymer compound is produced by heating a mixture of the liquid crystalline polymer compound having an ester bond and an optically active low molecular weight compound having an aliphatic hydroxyl group so that the low molecular weight compound is introduced as an optically active unit into the liquid crystalline polymer compound.

The reaction temperature is usually 200° C. or higher to 300° C. or lower, preferably 220° C. or higher to 280° C. or lower, and more preferably 240° C. or higher to 260° C. or lower. A reaction temperature of lower than 200° C. is not preferable because it is less likely to induce a reaction of the ester bonds in the liquid crystalline polymer compound with the hydroxyl group in the optically active low molecular compound, while a reaction temperature of higher than 300° C. is not also preferable because the low molecular weight compound having a hydroxyl group may be racemized or decomposed.

The reaction is usually conducted under atmospheric pressure. However, when the optically active low molecular weight compound having a hydroxyl group is low in volatility or becomes less liable to vaporize after the reaction thereof with the liquid crystalline polymer compound progresses to some extent, the reaction may be conducted under reduced pressure in order to accelerate the reaction. For a similar purpose, an inert gas such as nitrogen may be allowed to circulate in the reaction system. The low molecular weight compound having a hydroxyl group may be high in volatility depending on the reaction temperature. In such a case, the reaction may be conducted under pressure. However, this reaction is not preferable because it is difficult to distil out the by-products.

The reaction time is usually 30 minutes or longer to 100 hours or shorter, preferably one hour or longer to 50 hours or shorter. A reaction time of shorter than 30 minutes is not preferable because the reaction may not progress sufficiently, while a reaction time of longer than 100 hours is not also preferable because the thermal decomposition of the resulting optically active liquid crystalline polymer compound may progress.

The mix ratio of the liquid crystalline polymer compound having an ester bond and the optically active low molecular weight compound having a hydroxyl group can not be determined with a certainty because it depends on the use of the resulting compound. However, the low molecular weight compound is added in an amount of usually 0.01 percent by mass or more to 20 percent by mass or less, preferably 0.1 percent by mass or more to 15 percent by mass or less, and particularly preferably 0.5 percent by mass or more to 10 percent by mass or less, of the mass of the liquid crystalline polymer compound. If the low molecular weight compound of less than 0.01 percent by mass is added, the resulting polymer fails to take a sufficient twisted structure and exhibits no difference in characteristics from a polymer with no optically active unit introduced therein. If the low molecular weight compound of more than 20 percent by mass is added, the resulting polymer may be significantly reduced in molecular weight as described below.

The optically active liquid crystalline polymer compound produced by the process of the present invention is usually smaller in molecular weight (number-average molecular weight and weight-average molecular weight) than the liquid crystalline polymer compound prior to be reacted. Therefore, it is preferable to react a liquid crystalline polymer compound with a prescribed molecular weight estimated by considering such molecular weight reduction occurring during the reaction. An optically active liquid crystalline polymer compound with a molecular weight equivalent to or higher than that of the liquid crystalline polymer compound prior to be reacted can be produced by reacting a liquid crystalline polymer compound having an ester bond and an optically active low molecular weight compound under the above-described conditions and then further heating the resulting liquid crystalline polymer compound at a temperature equal to or higher than the temperature of the previous reaction for a period extended in consideration of the previous heating time so as to increase the molecular weight of the resulting compound.

The process of the present invention can reproduce optically active liquid crystalline polymer compounds with a variety of molecular weights and thus produce any optically active liquid crystalline polymer compounds with an intended molecular weight by properly selecting the molecular weight of the liquid crystalline polymer compound and the amount of the optically active low molecular weight compound, to be reacted.

The optically active liquid crystalline polymer compound produced as described can exhibit a liquid crystal phase such as a cholesteric phase and a chiral smectic phase, in a liquid crystal state. The twisted structure in the liquid crystal phase can contribute the enhancement of strength thereof (twisting power) with the aid of the optically active units and exhibits optical characteristics such as refractive anisotropy, selective reflection and optical interference.

The optically active liquid crystalline polymer compound produced by the process of the present invention may be molded by injection so as to be used as various molded articles or may be formed into a film. The polymer compound may be formed into a film by extruding it in a molten state from a T-die or coating a solution of the compound on a suitable substrate.

Particularly when the optically active liquid crystalline polymer compound produced by the process of the present invention is used as a film for optical purposes utilizing its optical characteristics, it is preferably formed into such a film by the following method. The term "liquid crystalline polymer compound" used hereinafter denotes the optically active liquid crystalline polymer compound produced by the process of the present invention.

First of all, a coating film is formed by coating on a substrate the liquid crystalline polymer compound in a molten state or a solution thereof. The coating film on the substrate is dried and then, if necessary, subjected to a step of heat treatment for alignment of the liquid crystal and a step of fixing the alignment.

There is no particular restriction on the solvent used for preparation of the solution as long as the solvent can dissolve the liquid crystalline polymer compound and can be distilled out under suitable conditions. Examples of the solvent include ketones such as acetone, methyl ethyl ketone, and isophorone; ether alcohols such as butoxy ethyl alcohol, hexyloxy ethyl alcohol, and methoxy-2-propanol; glycol ethers such as ethylene glycol dimethylether and diethylene glycol dimethyl ether; ester-based solvents such as ethyl acetate, methoxypropyl acetate and ethyl lactate; phenol-based solvents such as phenol and chlorophenol; amide-based solvents such as N,N-dimethylformamide, N,N-dimethylacetoamide, and N-methylpyrrolidone; halogenated hydrocarbon-based solvents such as chloroform, tetrachloroethane, and dichlorobenzene; and mixtures thereof.

Any of surfactants, defoaming agents, or leveling agents may be added to the solution so as to form a uniform coating film on a substrate. Furthermore, for the purpose of coloring, any of dichroric dyes, dyes, or pigments may be added to an extent that the exhibition of liquid crystallinity is not bothered.

No particular limitation is imposed on the method of coating the liquid crystalline polymer compound of the present invention as long as it can ensure the uniformity of the coating film. Therefore, there may be used any conventional method such as roll coating, die coating, dip coating, curtain coating, or spin coating methods. The coating may be followed by a solvent-removing process, i.e., drying using a heater or a hot air blowing. The thickness of the dried coating film may be adjusted to the desired thickness but is usually from 0.1 µm to 50 µm, preferably from 0.2 µm to 20 µm, more preferably from 0.3 µm to 10 µm for optical purposes.

Thereafter, if necessary, the coating film is heated so as to form a specific liquid crystal phase, such as a cholesteric phase or a chiral smectic phase and then fixed in such a phase. In this heat treatment, the coating film is heated to the range of temperatures at which the liquid crystalline polymer compound exhibits a liquid crystal phase, and aligned to form the liquid crystal phase by its self-alignability. Since the conditions for the heat treatment vary in optimum conditions and limits depending on the liquid crystal phase behavior temperature (transition temperature) of the liquid crystalline polymer compound to be used, it can not be determined with certainty. However, the heat treatment is conducted at a temperature within the range of usually 10 to 300° C., preferably 30 to 250° C. A too low temperature is not preferred because there is a possibility that the alignment of the liquid crystal may not proceed sufficiently, while a temperature in excess of 300° C. is not also preferred because the compound is likely to decompose. The heat treatment is conducted for usually 3 seconds to 60 minutes, preferably 10 seconds to 30 minutes. The heat treatment for shorter than 3 seconds is not preferable because the alignment of the liquid crystal may not be completed. Whereas, the heat treatment for longer than 60 minutes is not also preferred because the productivity is extremely deteriorated. After the alignment of the liquid crystal is completed, it can be fixed by a suitable method.

Examples of the substrate which may be used in the present invention include film substrates of such as polyimide, polyamide, polyamideimide, polyphenylene sulfide, polyphenylene oxide, polyether ketone, polyetherether ketone, polyether sulfone, polysulfone, polyethylene terephthalate, polyethylene naphthalate, polyarylate, triacetyl cellulose, epoxy resins, and phenol resins.

The substrate may be those provided with alignability obtained by stretching any of the film substrates by an appropriate heating treatment, or subjecting any of the film substrates to a rubbing treatment wherein the film is rubbed in one direction with a rayon cloth, a rubbing treatment after a conventional alignment layer of polyimide, polyvinyl alcohol, or a silane coupling agent is formed over the film, an oblique vapor deposition with silicon oxide, or to any combination of these treatments.

Alternatively, the substrate may be a metal plate of aluminum, iron, or copper or any of various glass plates, on each of which surface fine grooves are regularly formed.

Examples of the application of the optically active liquid crystalline polymer compound produced by the process of the present invention as a film for optical purposes include various optical devices such as diffraction grating films utilizing optical interference, decorative films utilizing selective reflection, and compensation films for liquid crystal display devices utilizing the negative uniaxial refractive structure of a cholesteric structure. There is no particular restriction on the liquid crystal display devices in which the film is used. Therefore, the optical film may be used in various types of liquid crystal display devices such as transmissive type, reflective type, and transfective type liquid crystal display devices. Examples of the liquid crystal orientation mode in the liquid crystal cell of the liquid crystal display device include those of TN type, STN type, VA (vertical alignment) type, MVA (multi-domain vertical alignment) type, OCB (optically compensated bend) type, ECB (electrically controlled birefringence) type, HAN (hybrid-aligned nematic) type, and IPS (in-plane switching) type. The liquid crystal orientation mode in the cell may be those with a single orientation in the cell surface. Furthermore, on the contrary to VA type, MVA type is a mode wherein orientation directions are different in the cell surface. Therefore, the optical film may be used in a liquid crystal display device having a liquid crystal cell with divided orientations. Furthermore, when liquid crystal display devices in which the optical film may be used are exemplified by a method of applying a voltage to their liquid crystal cells, they may be those driven by a passive driving method using an ITO electrode and by an active driving method a TFT (thin film transistor) electrode or a TFD (thin film diode).

EXAMPLES

The present invention will be further described in the following examples, but should not be construed as being limited thereto. The composition of each polymer used in the examples was measured by 400 MHz $^1$H-NMR using JNM-GX400 manufactured by JEOL Ltd., after the polymer had been dissolved in deuterated chloroform or deuterated trifluoroacetic acid.

Example 1

16.6 g (0.1 mol) of terephthalic acid, 11.1 g (0.1 mol) of hydroquinone, 16.8 g (0.1 mol) of vanillic acid, and 33.7 g (0.33 mol) of acetic anhydride were charged into a 300 ml flask, heated to a temperature of 150° C. while stirring, and reacted at a temperature of 280° C. for 10 hours. After a part of the reactant was sampled, it was confirmed that the reactant was a nematic liquid crystalline polymer. Thereafter, once the temperature of the flask was lowered to 200° C., 2.0 g of (S)-2-methylbutanediol were added to thereto and well-mixed with the polymer. Thereafter, the mixture was heated to a temperature of 250° C. and reacted for 3 hours thereby obtaining a polymer represented by formula (1) below.

When the polymer of formula (1) was sandwiched between a pair of glass sheets and heated to a temperature of 220° C., selective reflection was observed in the infrared region. In this way, a cholesteric liquid crystalline polymer was able to be synthesized.

(Formula (1))

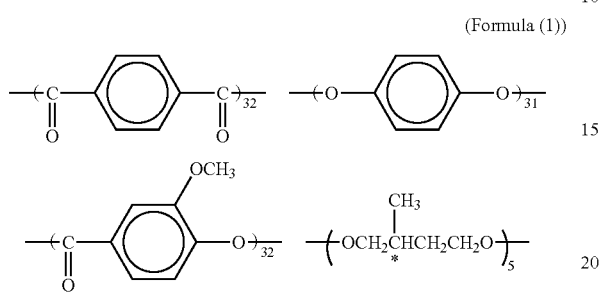

(the numerals next to parenthesis indicate the molar composition ratio.)

Example 2

4 percent by weight of isosorbide was added to a liquid crystalline polyester represented by formula (2) below, based on the weight thereof and reacted at a temperature of 250° C. for 5 hours thereby obtaining an optically active liquid crystalline polyester represented by formula (3) below. An N-methyl pyrrolidone solution of the polymer of formula (3) was coated on the rubbed polyimide layer formed on a glass substrate and heated at temperature of 230° C. thereby obtaining a film formed of the polymer of formula (3). The resulting film was transparent. When the cross-section of the film was observed through a transmission electron microscope, it was confirmed that the film had a uniform cholesteric liquid crystal orientation and the helical pitch thereof was 0.2 μm.

When the film on the rubbed polyimide layer of the glass substrate was incorporated into a commercially available MVA mode liquid crystal display device, it was confirmed that the viewing angle thereof was able to be improved.

[Formula (2)]

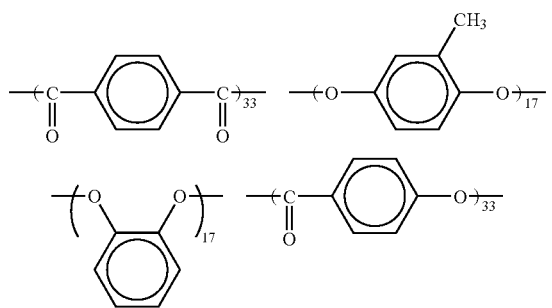

(the numerals next to parenthesis indicate the molar composition ratio.)

[Formula (3)]

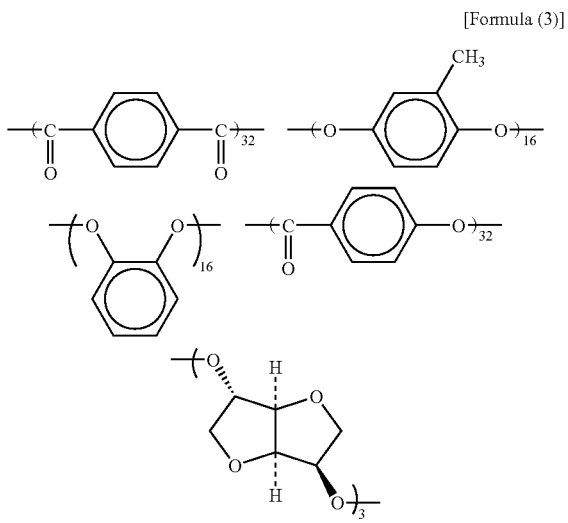

(the numerals next to parenthesis indicate the molar composition ratio.)

Example 3

7 percent by weight of (R)-3-methylhexanediol was added to a liquid crystalline polyester represented by formula (4), based on the weight thereof and reacted at a temperature of 260° C. for 2 hours and then at a temperature of 280° C. for another 5 hours thereby obtaining an optically active liquid crystalline polyester represented by formula (5). The polymer of formula (5) exhibited a cholesteric liquid crystallinity.

[Formula (4)]

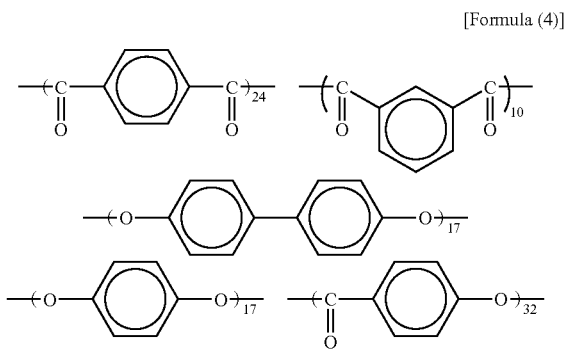

(the numerals next to parenthesis indicate the molar composition ratio.)

[Formula (5)]

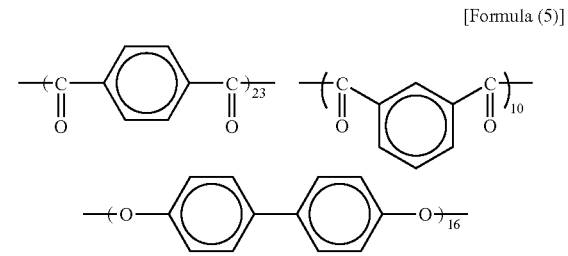

-continued

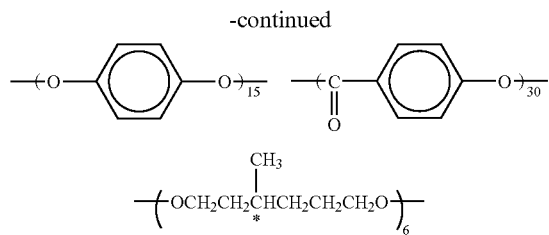

(the numerals next to parenthesis indicate the molar composition ratio.)

Example 4

After polyethylene terephthalate and 4-acetoxybenzoic acid were reacted at a temperature of 270° C. for 5 hours thereby obtaining a liquid crystalline polyester represented by formula (6) below, 10 percent by weight of cholesterol was added thereto and reacted at a temperature of 250° C. for 7 hours thereby obtaining an optically active polymer represented by formula (7) below. The polymer of formula (7) was dissolved in a mix solvent of 1,1,2,2-tetrachloroethane/p-chlorophenol (40/60 weight ratio) so as to prepare a solution. The solution was coated on a rubbed polyimide layer formed on a glass substrate and heated at a temperature of 230° C. thereby obtaining a film formed of the polymer of formula (7). The resulting film was transparent and exhibited selective reflection in the infrared region of about 1200 nm. When the film on the rubbed polyimide layer on the glass substrate was incorporated into a commercially available TN mode TFT liquid crystal display device, it was confirmed that the viewing angle thereof was extremely improved though the contrast viewed from the front was slightly reduced.

[Formula (6)]

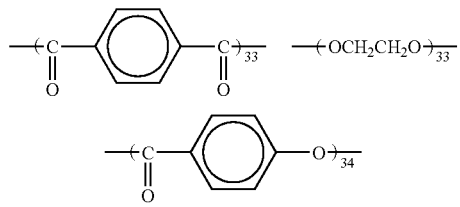

(the numerals next to parenthesis indicate the molar composition ratio.)

[Formula (7)]

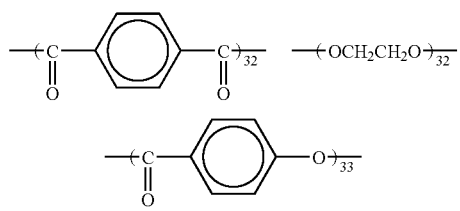

-continued

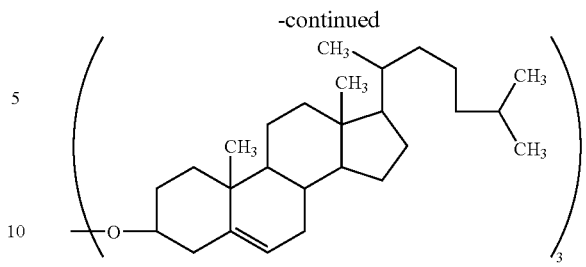

(the numerals next to parenthesis indicate the molar composition ratio.)

The process of the present invention can produce an optically active liquid crystalline polymer compound with excellent strength and optical characteristics at a low cost. The resulting optically active liquid crystalline polymer compound is suitably used as a film for optical purposes.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for producing an optically active liquid crystalline polymer compound wherein a liquid crystalline polymer compound having in its main or side chain an ester bond is reacted with an optically active low molecular weight compound having a hydroxyl group, so that the latter is introduced as a unit having an optically active group into the polymer compound.

2. The process for producing an optically active liquid crystalline polymer compound according to claim 1 wherein said optically active low molecular weight compound is a compound having a hydroxyl group bonded to an aliphatic carbon.

3. The process for producing an optically active liquid crystalline polymer compound according to claim 1 wherein said liquid crystalline polymer compound is a polyester having an ortho-substituted aromatic unit.

4. An optical film formed of an optically active liquid crystalline polymer compound produced by the process as defined in claim 1.

5. An optical film formed of an optically active liquid crystalline polymer compound produced by the process as defined in claim 2.

6. An optical film formed of an optically active liquid crystalline polymer compound produced by the process as defined in claim 3.

7. The process for producing an optically active liquid crystalline polymer compound according to claim 1 wherein the liquid crystalline polymer compound having in its main or side chain an ester bond is reacted at a temperature of 200° C. to 300° C. with the optically active low molecular weight compound having a hydroxyl group.

8. The process for producing an optically active liquid crystalline polymer compound according to claim 1 wherein the liquid crystalline polymer compound having in its main or side chain an ester bond is reacted by melt-polycondensation with the optically active low molecular weight compound having a hydroxyl group.

9. The process for producing an optically active liquid crystalline polymer compound according to claim 1 wherein the liquid crystalline polymer compound having in its main or side chain an ester bond is reacted in a non-solution process with the optically active low molecular weight compound having a hydroxyl group.

* * * * *